No. 686,764. Patented Nov. 19, 1901.
C. W. RICHARDS.
TOOTH BRUSH.
(Application filed Apr. 12, 1901.)
(No Model.)
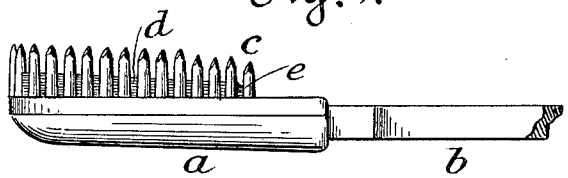
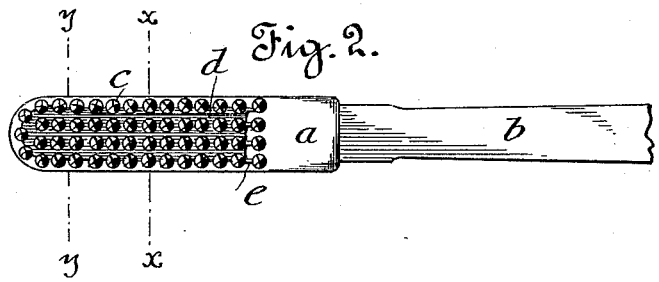
 
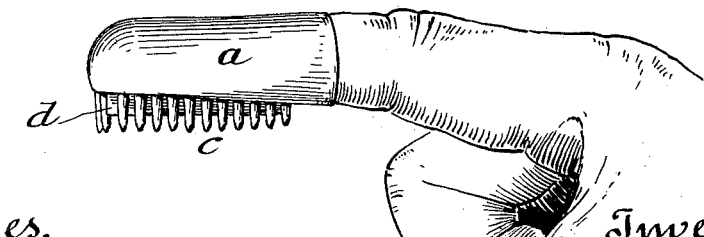
Witnesses.
Inventor.
Charles W. Richards
by Spear Seely
Attorneys.

UNITED STATES PATENT OFFICE.

CHARLES W. RICHARDS, OF SAN FRANCISCO, CALIFORNIA.

TOOTH-BRUSH.

SPECIFICATION forming part of Letters Patent No. 686,764, dated November 19, 1901.

Application filed April 12, 1901. Serial No. 55,565. (No model.)

*To all whom it may concern:*

Be it known that I, CHARLES W. RICHARDS, a citizen of the United States, residing at San Francisco, in the county of San Francisco and State of California, have invented certain new and useful Improvements in Tooth-Brushes, of which the following is a specification.

My invention relates to tooth-brushes of the class in which soft-rubber cleansing-points project from a brush-head, of which they are usually an integral part.

My invention is also an improvement upon that shown and described in Letters Patent No. 659,593, granted to me October 9, 1900, and is designed to accomplish the object therein set forth in a better way. In that patent long cleansing-points were connected by webs of soft rubber in order to somewhat restrain their flexibility and prevent them from spreading and flattening out too much in use. The construction therein shown is effective for such purpose; but the number of webs used form corners and recesses, which require care in keeping clean. In my present invention I have produced a construction of the brush-head which obviates this difficulty and at the same time secures the advantages described in the patent referred to.

In the accompanying drawings, Figure 1 is a side elevation of a brush constructed according to my invention. Fig. 2 is a plan view of the same. Fig. 3 is a cross-section on line $x\ x$ of Fig. 2. Fig. 4 is a cross-section on line $y\ y$ of Fig. 2. Fig. 5 shows the brush as forming part of a finger-cot.

The brush-head $a$ is hollow and is adapted to receive a handle $b$ or may be made in the form of a finger-cot, as shown in Fig. 5. It is preferably molded from soft rubber, together with its teeth, so as to form an integral structure. From one side of the brush-head project the teeth or cleansing-points $c$, usually arranged in symmetrical rows, as shown in Fig. 2.

Instead of connecting the teeth by webs to somewhat restrain their tendency to spread I accomplish the same purpose by molding the flat face of the brush-head with a solid block $d$ of rubber rising from the surface, but leaving a surrounding margin, as shown in Fig. 2. This margin is the plane of the brush-head surface. One complete row of teeth at each side and end is molded so as to rise both from the margin and from the block, as clearly shown in Fig. 4. The interior teeth rise from the block $d$ and are shorter than the outer rows. The teeth are, however, preferably lessened in length toward the handle of the brush, the longest ones being at the extreme end; but at any cross-section the points of the teeth taken transversely are upon about the same plane, Figs. 3 and 4. The solid block produces substantially the same effect as a number of connecting-webs as to restraining the tendency of the teeth to spread under pressure, while the outside rows, being connected half to the block and half to the brush-head, are under the same restraining influence. At the same time all corners and interstices are done away with, the surfaces from which the teeth rise being plane surfaces. The style and appearance of the brush are also preserved by the outer rows of long teeth, and as the block is practically hidden by the teeth there is no appearance of weight or clumsiness.

I may, if I desire, connect the outside teeth to the blocks by webs instead of directly, and to illustrate this I have shown the transverse row of teeth at the inner end connected to the block by such webs $e$.

Having thus fully described my invention, what I claim as new, and desire to secure by Letters Patent, is—

1. A tooth-brush comprising a brush-head of soft rubber, a block of the same material rising from the surface of said brush-head, relatively short teeth projecting from the block, and relatively long teeth projecting from the surface of the brush-head surrounding the block, and connected to the block.

2. A tooth-brush comprising a brush-head of soft rubber, a block of the same material rising from a portion of the surface of the brush-head, and having relatively short teeth projecting from it, and relatively long teeth projecting partially from the adjacent surface of the brush-head and partially from the block.

In testimony whereof I have affixed my signature, in presence of two witnesses, this 2d day of March, 1901.

CHARLES W. RICHARDS.

Witnesses:
H. D. PILLSBURY,
L. W. SEELY.